(12) United States Patent
Suzuki et al.

(10) Patent No.: US 10,397,794 B2
(45) Date of Patent: Aug. 27, 2019

(54) COMMUNICATION IN UNLICENSED SPECTRUM

(71) Applicant: BLACKBERRY LIMITED, Waterloo (CA)

(72) Inventors: Takashi Suzuki, Ichikawa (JP); Eswar Vutukuri, Havant (GB); Zhijun Cai, Herndon, VA (US); Werner Kreuzer, Baiern (DE)

(73) Assignee: BlackBerry Limited, Waterloo, Ontario (CA)

( * ) Notice: Subject to any disclaimer, the term of this patent is extended or adjusted under 35 U.S.C. 154(b) by 1 day.

(21) Appl. No.: 14/609,019

(22) Filed: Jan. 29, 2015

(65) Prior Publication Data

US 2016/0227416 A1  Aug. 4, 2016

(51) Int. Cl.
| | |
|---|---|
| *H04W 72/12* | (2009.01) |
| *H04W 16/14* | (2009.01) |
| *H04W 72/04* | (2009.01) |
| *H04W 74/00* | (2009.01) |
| *H04W 84/12* | (2009.01) |

(52) U.S. Cl.
CPC ....... *H04W 16/14* (2013.01); *H04W 72/0453* (2013.01); *H04W 72/1215* (2013.01); *H04W 74/004* (2013.01); *H04W 84/12* (2013.01)

(58) Field of Classification Search
CPC ... H04W 76/023; H04W 8/005; H04W 48/08; H04W 48/16; H04W 76/026; H04W 84/12; H04W 4/005; H04W 88/08; H04W 72/042; H04W 16/14; H04W 72/0453; H04W 72/02; H04W 72/14; H04W 72/0413; H04W 72/044; H04W 72/1215; H04W 72/1252; H04L 5/0058
See application file for complete search history.

(56) References Cited

U.S. PATENT DOCUMENTS

| | | | |
|---|---|---|---|
| 9,351,185 B2* | 5/2016 | Charbit | ............... H04W 16/14 |
| 2012/0207033 A1 | 8/2012 | Hakola et al. | |
| 2013/0322279 A1 | 12/2013 | Chincholi | |
| 2014/0204791 A1 | 7/2014 | Teng et al. | |

(Continued)

FOREIGN PATENT DOCUMENTS

| | | |
|---|---|---|
| WO | 2013071488 | 5/2013 |
| WO | 2014071140 A2 | 5/2014 |

OTHER PUBLICATIONS

3GPP TS 23.303 V12.3.0, Technical Specification, 3rd Generation Partnership Project, Technical Specification Group Services and System Aspects, Proximity-based services (ProSe), Stage 2 (Release 12) (Dec. 2014) (62 pages).

(Continued)

*Primary Examiner* — Jae Y Lee
*Assistant Examiner* — Aixa A Guadalupe Cruz
(74) *Attorney, Agent, or Firm* — Trop, Pruner & Hu, P.C.

(57) ABSTRACT

A wireless access network node receives assistance information from a user equipment (UE) or other wireless access network node, the assistance information comprising information indicating one or more channels of an unlicensed spectrum to use or avoid. Responsive to the assistance information, the wireless access network node selects at least a first channel of the unlicensed spectrum for communicating data of the UE.

23 Claims, 8 Drawing Sheets

(56) References Cited

U.S. PATENT DOCUMENTS

| | | | | |
|---|---|---|---|---|
| 2015/0063151 A1* | 3/2015 | Sadek | ............... | H04W 24/08 |
| | | | | 370/252 |
| 2015/0305070 A1* | 10/2015 | Ahmad | ............... | H04W 48/20 |
| | | | | 370/338 |
| 2015/0351115 A1* | 12/2015 | Jeon | ............... | H04W 48/16 |
| | | | | 455/450 |
| 2016/0066195 A1* | 3/2016 | Moon | ............... | H04W 16/14 |
| | | | | 455/454 |
| 2016/0073344 A1 | 3/2016 | Vutukuri et al. | | |

OTHER PUBLICATIONS

3GPP TS 36.213 V12.4.0, Technical Specification, 3rd Generation Partnership Project, Technical Specification Group Radio Access Network, Evolved Universal Terrestrial Radio Access (E-UTRA), Physical layer procedures (Release 12) (Dec. 2014) (225 pages).

3GPP TS 36.300 V12.4.0, Technical Sepcification, 3rd Generation Partnership Project, Technical Specification Group Radio Access Network, Evolved Universal Terrestrial Radio Access (E-UTRA) and Evolved Universal Terrestial Radio Access Network (E-UTRAN), Overall description, Stage 2 (Release 12) (Dec. 2014) (251 pages).

3GPP TS 36.306 V12.3.0, Technical Specification, 3rd Generation Partnership Project, Technical Specification Group Radio Access Network, Evolved Universal Terrestrial Radio Access (E-UTRA), User Equipment (UE) radio access capabilities (Release 12) (Dec. 2014) (36 pages).

3GPP Ts 36.321 V12.4.0, Technical Specification, 3rd Generation Partnership Project, Technical Specification Group Radio Access Network, Evolved Universal Terrestrial Radio Access (E-UTRA), Medium Access Control (MAC) protocol specification (Release 12) (Dec. 2014) (60 pages).

3GPP TS 36.331 V12.4.0, Technical Specification, 3rd Generation Partnership Project, Technical Specification Group Radio Access Network, Evolved Universal Terrestrial Radio Access (E-UTRA), Radio Resource Control (RRC), Protocol specification (Release 12) (Dec. 2014) (410 pages).

3GPP TR 36.816 V11.2.0, Technical Report, 3rd Generation Partnership Project, Technical Specification Group Radio Access Network, Evolved Universal Terrestrial Radio Access (E-UTRA), Study on signalling and procedure for interference avoidance for in-device coexistence (Release 11) (Dec. 2011) (44 pages).

3GPP TR 37.870 V0.4.0, Technical Report 3rd Generation Partnership Project, Technical Specification Group Radio Access Network, Study on Multi-RAT joint coordination (Release 13) (Oct. 2014) (18 pages).

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical layer (PHY) Specifications, IEEE Std 802.11 2012, 2793 pages.

Adriana B. Flores et al., IEEE 802.11af: A Standard for TV White Space Spectrum Sharing, Oct. 2013 (15 pages).

QUALCOMM, Extending the Benefits of LTE Advanced to unlicensed spectrum, Apr. 2014 (19 pages).

3GPP TSG RAN WG1 Meeting #79, R1-144702, San Francisco, USA, Title: Channel Selection for Licensed-Assisted Access, Source: Alcatel-Lucent, Alcatel-Lucent Shanghai Bell, Agenda Item: 6.3.2.2, Document for: Discussion/Decision, Nov. 17-21, 2014 (4 pages).

3GPP TSG RAN WG1 Meeting #79, R1-144740, San Francisco, USA, Agenda Item: 6.3.2.2, Source: Samsung, Title: Discussion on carrier selection for LAA, Document for: Discussion and Decision, Nov. 17-21, 2014 (4 pages).

3GPP workshop on LTE in unlicensed spectrum, RWS-140002, Sophia Antipolis, France, Jun. 13, 2014 (13 pages).

3GPP workshop on LTE in unlicensed spectrum, RWS-140005, Sophia Antipolis, France, Agenda Item: 2, Source: HiSilicon, Scenarios, spectrum considerations and preliminary assessment results of U-LTE, Jun. 15, 2014 (21 pages).

Cable Television Laboratories, Inc., CableLabs Perspectives on LTE-U Coexistence with Wi-Fi and Modes for LTE-U, 2014 (15 pages).

Dino Flore, 3GPP workshop on LTE in unlicensed spectrum, Sophia, Antipolis, France, RWS-140029, Chairman Summary, Jun. 13, 2014 (11 pages).

T-Mobile USA, View on LTE Carrier Aggregation with Unlicensed Spectrum, 3GPP Workshop on "LTE-U," Sophia Antipolis (France), Jun. 13, 2014 (8 pages).

ETSI TR 102 802 V1.1.1, Technical Report, Reconfigurable Radio Systems (RRS), Cognitive Radio System Concept (Feb. 2010) (31 pages).

Cisco, 802.11ac: The Fifth Generation of Wi-Fi, Technical White Paper, Mar. 2014 (25 pages).

European Patent Office, International Search Report and Written Opinion for PCT/US2016/015185 dated May 9, 2016 (11 pages).

European Patent Office, Communication pursuant to Article 94(3) EPC for Appl. No. 16704748.9 dated Jan. 15. 2019 (6 pages).

* cited by examiner

COMMUNICATION IN UNLICENSED SPECTRUM

BACKGROUND

As the demand for wireless data communication using wireless user equipments (UEs) has increased, wireless access service providers are increasingly facing challenges in meeting capacity demands of UEs served by wireless access network nodes. To meet capacity demands relating to communications of UEs served by wireless access network nodes, proposals have been made in which an unlicensed spectrum can be used for data communications. The unlicensed spectrum includes frequencies that are in addition to frequencies within a licensed spectrum that are available to a respective wireless access service provider.

BRIEF DESCRIPTION OF THE DRAWINGS

Some implementations are described with respect to the following figures.

DETAILED DESCRIPTION

Figure 1C:
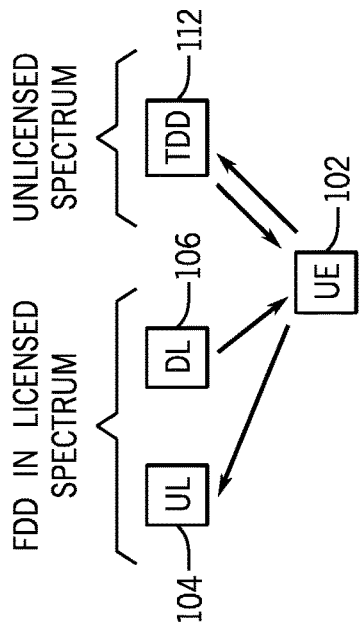
FIGS. 1A-1D are schematic diagrams illustrating use of licensed and unlicensed carriers to support communications with a user equipment (UE), according to some examples.

A mobile communications network can operate according to one of various different types of standards. In some implementations, a mobile communications network can operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to LTE or E-UTRA in the ensuing discussion, it is noted that techniques or mechanisms according to some implementations can be applied to other wireless access technologies.

To expand capacity of a mobile communications network to support data communications of user equipments (UEs), Licensed Assisted Access (LAA) operations are being considered, in which communications in the mobile communications network can be performed over an unlicensed spectrum. An unlicensed spectrum includes frequencies that are not part of the licensed spectrum for a given mobile communications network. For example, LTE can be associated with a specific licensed spectrum that includes frequencies over which LTE communications can occur. An unlicensed spectrum includes frequencies outside the LTE licensed spectrum, e.g. frequencies currently used by Wi-Fi.

LAA for an LTE access or network can also be referred to as LTE-U (Long-Term Evolution in unlicensed spectrum). FIGS. 1A-1D illustrates examples of Licensed-Assisted Carrier Aggregation arrangements, in which use of the unlicensed spectrum is in the context of a Carrier Aggregation framework. Carrier Aggregation (CA) is a feature that allows two or more component carriers (CCs) to be simultaneously used by a wireless access network node to send data to or receive data from the same UE. LTE currently allows carrier aggregation for up to five component carriers at the same time. In other examples, other CA arrangements with different numbers of component carriers can be provided.

Licensed-Assisted CA operation employs a carrier in the unlicensed spectrum as being one of the component carriers for CA. FIG. 1A shows communications with a UE 102 using three different component carriers: a first component carrier 104 for uplink (UL) communications from the UE 102 to a wireless access network node, a second component carrier 106 for downlink (DL) communications from the wireless access network node to the UE 102, and a third component carrier 108 that is in the unlicensed spectrum for DL communications with the UE 102.

In an E-UTRA network, a wireless access network node can be implemented as an enhanced Node B (eNB), which includes functionalities of a base station and base station controller. Although reference is made to eNBs in the ensuing discussion, it is noted that techniques or mechanisms according to the present disclosure can be applied with other types of wireless access network nodes that operate according to other protocols.

The first and second component carriers 104 and 106 in FIG. 1A are part of the LTE licensed spectrum. FIG. 1A shows an example of frequency division duplex (FDD) communications in the licensed spectrum, where the uplink and downlink communications are provided over separate frequencies.

Since the unlicensed spectrum is used just for DL communications to the UE 102, the arrangement of FIG. 1A can be referred to as a Supplementary Downlink only (SDL) arrangement. The component carriers 104, 106, and 108 can form a CA. Note that additional component carriers from the licensed spectrum and/or the unlicensed spectrum can be part of the CA.

Figure 1D:
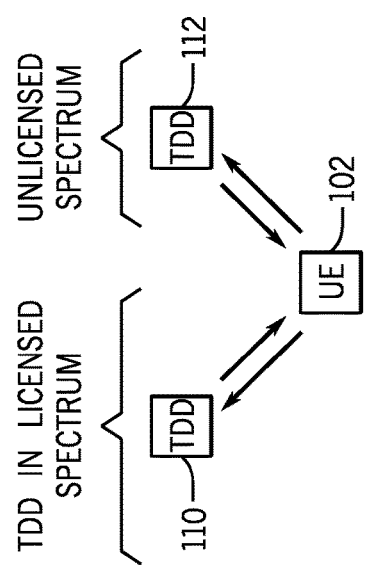
Figure 1A:
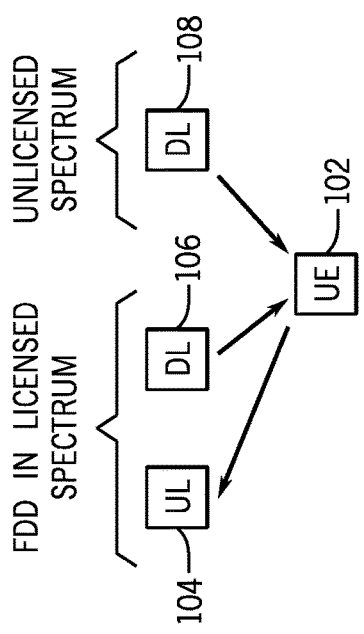
Figure 1B:
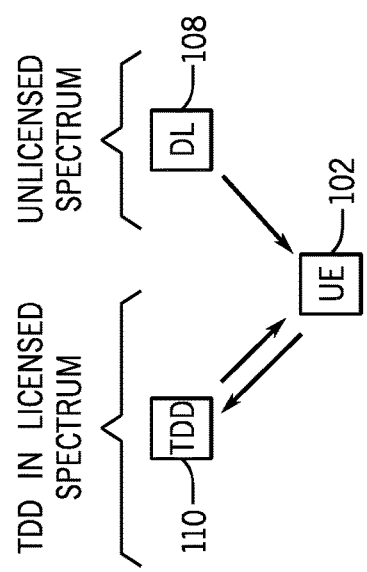

FIG. 1B shows an alternative example arrangement of an SDL arrangement in which time division duplex (TDD) communications is performed in the licensed spectrum, where uplink and downlink communications can occur over a common component carrier 110 but in different time periods. In the example of FIG. 1B, the component carrier 108 in the unlicensed spectrum can also be used for only DL communications.

In other examples, cells provided on carriers in the unlicensed spectrum can be used to support both UL and DL communications, as depicted in each of FIGS. 1C and 1D. Such an arrangement is referred to as a Supplementary UL/DL carrier in TDD arrangement. In FIG. 1C, FDD communications is provided in the licensed spectrum using component carriers 104 and 106, and TDD communications (UL and DL communications in different time periods) can be performed using a component carrier 112. In FIG. 1D, TDD communications is performed in the licensed spectrum using the component carrier 110, while TDD communications is also performed in the unlicensed spectrum using the component carrier 112.

In other examples, carriers of an unlicensed spectrum can be used in other arrangements, such as in a Licensed-Assisted Dual connectivity arrangement (where a UE has a dual connection to a carrier in the licensed spectrum and a carrier in the unlicensed spectrum) or a standalone arrangement (in which the UE communicates just over a carrier in the unlicensed spectrum, with no association with a carrier in the licensed spectrum) or an arrangement where FDD is used both in the licensed spectrum and an unlicensed spectrum.

In some implementations, signaling related to UE access of a wireless access network, UE mobility, and other control messages can be communicated over the primary (licensed) carrier (in the licensed spectrum). The secondary carrier (in the unlicensed spectrum) can be used for opportunistic increase of throughput for data communications between an eNB and a UE (in the DL direction only, or in both the DL and UL directions).

One or more cells can be provided on a given component carrier, either in the licensed or unlicensed spectrum. In the context of CA, a "cell" can refer generally to a coverage area provided by a wireless access network node on the respective component carrier. A primary cell, or PCell, can be configured on a component carrier in the licensed spectrum, while a secondary cell, or SCell, can be configured on each of the other one or more component carriers of the CA, where an SCell can be configured on a component carrier in either the licensed or unlicensed spectrum. The PCell is used to communicate certain control information in addition to the data traffic to UEs served by the PCell, while an SCell is used to communicate data traffic and certain control information related to the data traffic. "Data traffic" can refer to bearer data, which can include user data (e.g. voice data or other data communicated by a user), application data, and so forth.

LTE-U targets fair sharing of channel resources such as the carrier frequencies in an unlicensed spectrum with incumbent systems (e.g. Wi-Fi systems) operating in the same unlicensed bands. An incumbent system refers to a system that normally uses carriers of the unlicensed spectrum. For global addressability of a potential LTE-U solution, the features enabling this fair sharing should be frequency band and region agnostic.

Also, it is desirable to protect primary use entities of the unlicensed spectrum. A primary use entity is an entity that uses specific frequency band(s) of the unlicensed spectrum, and is to be given priority for use of such specific frequency band(s), according to government regulation or other arrangement. An example of a primary use entity is an entity that performs radio detection and ranging (Radar), which includes using radio signals to determine the range, altitude, direction, or speed of objects, such as aircraft, spacecraft, motor vehicles, weather formations, and so forth. Dynamic Frequency Selection (DFS) and Transmit Power Control (TPC) can be employed for avoiding or reducing interference with Radar operation. DFS provides frequency spectrum management that detects and avoids use of carrier frequencies in which Radar operation is ongoing, while TPC reduces transmission power to reduce interference between devices.

Another example of a primary use entity is an entity that transmits TV signals.

Figure 2:
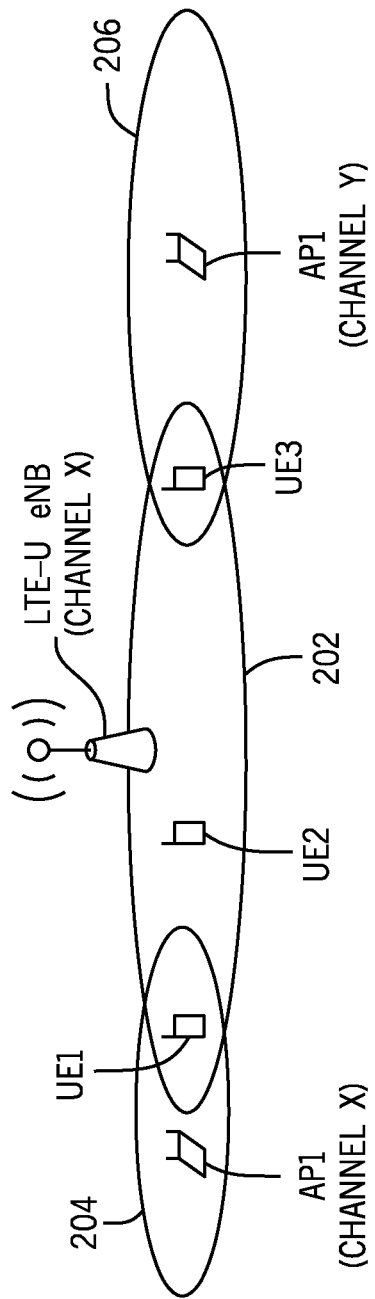
FIG. 2 is a schematic diagram of an example network arrangement including various wireless access network nodes according to some examples.

In some scenarios, as depicted in an example according to FIG. 2, frequencies seen as vacant or having low interference by an LTE-U eNB may not be seen as vacant or having low interference by some of the UEs in the coverage of the LTE-U eNB. An LTE-U eNB refers to an eNB that is capable of LTE-U or LAA operation. FIG. 2 shows a coverage area 202 of the LTE-U eNB, and respective coverage areas 204 and 206 of corresponding access points AP1 and AP2, which can be WLAN APs that operate according to IEEE 802.11, for example.

Each of UE1, UE2, and UE3 is in the coverage area 202 of the LTE-U eNB, while UE1 is also in the coverage area 204 of AP1 and UE3 is in the coverage area of AP2. It is assumed that the LTE-U eNB and AP1 use channel X, while AP2 uses channel Y. A "channel" can refer to a specific frequency used by the respective node to perform communications. Since UE2 is just in the coverage area 202 of the LTE-U eNB, UE2 does not experience interference (or more specifically, wireless communications between UE2 and the LTE-U eNB do not experience interference) from another wireless access network node (e.g. another AP). Also, although UE3 is in the coverage areas 202 and 206 of both the LTE-U eNB and AP2, UE3 does not experience interference due to communications AP2 since the LTE-U eNB and AP2 use different channels (channel X and channel Y).

However, UE1 can experience interference (or more specifically, wireless communications between UE1 and the LTE-U eNB can experience interference) on channel X due to the operation of AP1. Similarly, any WLAN devices connected to AP1 and AP1 itself may experience interference due to the communications between UE1 and the LTE-U eNB.

Conventionally, effective channel selection mechanisms are not provided with LTE-U eNBs to address interference issues of UEs (served by the LTE-U eNBs) due to operations of proximate APs or other wireless access network nodes. Channel selection by an LTE-U eNB can refer to selection of one or more channels in an unlicensed spectrum to use for communications with a UE served by the LTE-U eNB. Traditional channel selection mechanisms do not consider presence of primary use entities or the other entities in channels of the unlicensed spectrum, whether certain channels of the unlicensed spectrum are being used by Radar or UEs for certain purposes based on user preference, such as Wi-Fi communications (e.g. enterprise Wi-Fi or home Wi-Fi), and/or other considerations.

Moreover, if channel selection and bandwidth adjustment are performed independently by each of multiple systems (e.g. LTE-U eNBs and APs) sharing a common frequency band, then knowledge from those other system(s) cannot be taken into account in a preemptive manner. That is, a system can only react to the channel and bandwidth choices of other systems based on, for example, measurements of the interference observed. Such a scheme is referred to here as "reactive coordination."

To realize faster and more efficient channel selection and bandwidth adjustment, coordination between systems (e.g. between WLAN APs and LTE-U eNBs) can be considered.

UE Assistance Information Reporting and LTE-U UE Capabilities

Figure 3:
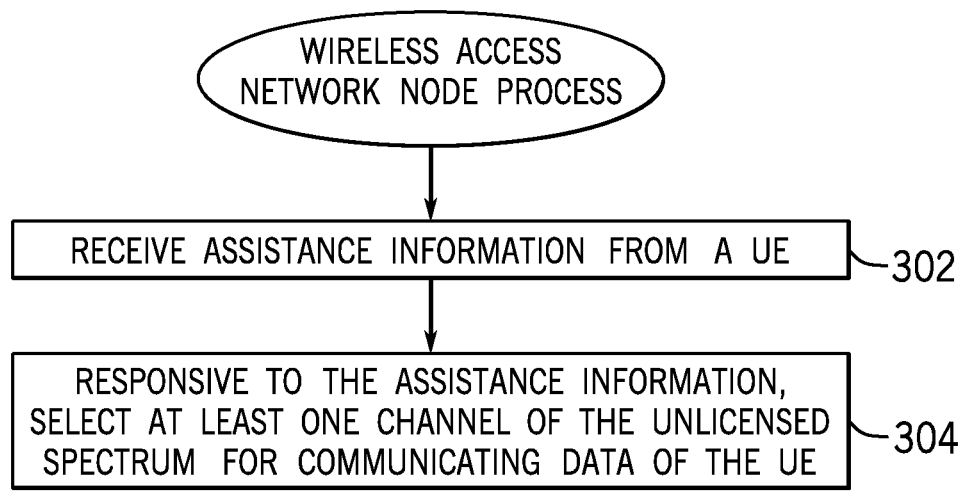
FIG. 3 is a flow diagram of a process of a wireless access network node according to some implementations.

In accordance with some implementations of the present disclosure, as shown in FIG. 3, an LTE-U eNB (or more generally, a wireless access network node) receives (at 302) assistance information from a UE, where the assistance information includes information indicating one or more channels of an unlicensed spectrum to use or avoid. As discussed further below, the assistance information can also include other information. Alternatively, the assistance information can be received from another network entity besides a UE, such as another wireless access network node.

Responsive to the assistance information, the LTE-U eNB (or more generally, the wireless access network node) selects (at 304) at least one channel of the unlicensed spectrum for communicating data of the UE. Channel selection can refer to picking or choosing a specific channel or multiple channels (the best channel(s) according to some criterion or criteria) to use for operation. Channel selection can also be performed as part of bandwidth adjustment, which refers to a selection of a plurality of channels to use, such as the number of channels for component carriers of a CA or dual connectivity.

UE Assistance Information

In some implementations, any or some combination of the following assistance information can be reported from the UE to an LTE-U eNB to assist the LTE-U eNB in selection of channels for LTE-U operation.

- A list of the most preferred channels of the unlicensed spectrum from the UE's perspective based on interference or congestion level or averaged delay information, or other criteria.
- A list of least preferred channels or frequencies of the unlicensed spectrum from the UE's perspective based on interference or congestion level, or other criteria.
- A list of channels of the unlicensed spectrum in which a primary use entity (e.g. an entity performing Radar operation or TV signal transmission) has been detected. For example, a UE can detect Radar operation in a channel which may be an active SCell, a configured SCell, or a channel the UE is monitoring. A configured SCell is an SCell that has been configured, but is not yet actively used by a UE. A configured SCell can be activated to provide an active SCell that is actively used by a UE.
- A list of channels in which the UE detects strong interference from neighbor APs, non-AP stations (STAs) (such as mobile devices that are not APs), or neighbor LTE-U eNBs.
- (A number of) WLAN APs detected by the UE on a channel which is used as an active SCell, a configured SCell, or a channel the UE is monitoring. The UE may include only the top N (N≥1) WLAN APs with the strongest signal strength or other characteristic. Other information can be reported by the UE for each reported WLAN AP, including any or some combination of the following: basic service set identification (BSSID), basic service set (BSS) load information, primary channel, operating bandwidth, signal strength (e.g. received signal strength indication or RSSI), pathloss (if the transmission power of the AP is available), other information contained in Beacon frames, and other information. An AP along with the associated non-AP STAs are collectively referred to as a BSS.
- (A number of) neighbor LTE-U eNBs detected by the UE on a channel which is used as an active SCell, a configured SCell, or a channel the UE is monitoring. The UE may include only the top M (M≥1) LTE-U eNBs with the strongest signal strength or other characteristic. For each reported LTE-U eNB, the UE can also report other information, including any or some combination of the following: physical cell identity (PCI), global cell identity (GCI), public land mobile network identity (PLMN ID), signal strength (e.g. reference signal received power or RSRP), pathloss (if the transmission power of the eNB is made available via signaling over licensed carriers), channel utilization information, and other information.
- The location information of the UE.
- A list of frequencies or channels which are currently reserved by a user of the UE. The user may be using one or more channels for other purposes than LTE-U operation, such as for another access technology, e.g. for home Wi-Fi, Wi-Fi Direct, or enterprise Wi-Fi access. The list may include at least one of the non-LTE-U channels being used and also potentially other (e.g. nearby) channels which also cannot be utilized due to the UE's activity on the non-LTE-U channel(s). Such other (e.g. nearby) channels may be unavailable due to hardware restrictions of the UE, such as achievable filter spacings, for example, due to use of further channels by other access technologies.
- A list of the most preferred channels from the perspective of the UE's radio frequency (RF) architecture based on the current utilization of unlicensed spectrum.

The UE may report the most preferred channels in the order of preference considering one or more criteria described above. Alternatively the UE may report the least preferred channels in the order of undesirableness considering one or more criteria described above.

CQI Reporting

Once an LTE-U SCell (an SCell provided on a channel of an unlicensed spectrum) is added by an LTE-U eNB, the UE may report the quality of the SCell channel to the LTE-U eNB using Channel Quality Indicator reporting mechanisms or procedures. In some implementations, a channel quality report (including a CQI) may be sent to the LTE-U eNB via a licensed channel (i.e. the PCell on a licensed channel). In other implementations, a wideband channel quality report may be sent by the UE in an SCell on an unlicensed channel, to report the channel quality on a given SCell channel. The channel quality reports may be sent on the SCell or the licensed PCell (which will ensure these reports are received by the eNB even when the SCell is unavailable for UL transmissions). A CQI can indicate the channel quality in downlink that is estimated by the UE.

When an SCell is configured on an unlicensed channel (channel in an unlicensed spectrum), the UE may transmit CQI index value (or codepoint) 0 (out of range) concerning the SCell associated with LTE-U operation or an unlicensed spectrum in response to the UE detecting a problem. For example the UE may detect signal relating to Radar operation over the unlicensed channel, when DFS (discussed further above) is used to avoid any channel in which Radar operation is present. In some examples, the UE can determine whether Radar detection is to be performed in a given SCell on an unlicensed channel based on the Registered PLMN (RPLMN) country code and the channel number.

In another example, the UE may transmit CQI index value (or codepoint) 0 (out of range) concerning the SCell associated with LTE-U operation or an unlicensed spectrum when the UE detects in response to the UE detecting strong interference or an increased packet error rate that exceeds a specified threshold.

Upon receiving the out of range CQI report concerning an LTE-U SCell, the LTE-U eNB may suspend the use of a given channel (of the unlicensed spectrum) on which the LTE-U SCell is provided, for a specified time period, which is configurable. The LTE-U eNB may decide to stop utilizing the given channel by releasing the SCell(s) using the given channel from the UEs. In another alternative, the LTE-U eNB may simply not schedule any data and refrain from transmitting any signals over the given channel of the unlicensed spectrum until the reception of the UE report indicating that the channel is improved.

In response to receiving the out of range CQI report, if the LTE-U eNB determines that further information is desired, the LTE-U eNB can provide an uplink grant in a PCell to the UE, where the uplink grant grants use of an UL resource to the UE to perform communications of information to the LTE-U eNB. The UE may report additional information in a message in the granted UL resource, where the message can include a Medium Access Control (MAC) control element (CE) or a UE assistance information Radio Resource Control (RRC) message (both discussed further below).

In further implementations, different CQI index values (or codepoints) can be reported to indicate different conditions. In addition to CQI index values specified by Table 7.2.3-1 of 3GPP TS 36.213, additional CQI index values can be provided in accordance with the present disclosure. More specifically, in addition to CQI index values 0-15 provided by 3GPP TS 36.213, further CQI index values can be defined to indicate other conditions, including any or some combination of the following conditions:

(1) Presence of detected strong interference from an IEEE 802.11 AP (strong interference is interference exceeding a specified threshold, which can occur, for example, when the UE is close to the IEEE 802.11 AP operating in the same unlicensed channel).
(2) Presence of IEEE 802.11 beacon frames detected in an unlicensed channel.
(3) Presence of a primary use entity in an unlicensed channel such as Radar or TV signal.
(4) Presence of detected strong interference from another LTE-U source.

Conditions (1)-(4) above can be identified by respective new CQI index values (or codepoints) 16-19 specified in the following example table, where the new CQI index values are in addition to CQI index values defined by 3GPP TS 36.213

TABLE 7.2.3-1

5-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |
| 16 | | Out of range | Strong interference from an IEEE 802.11 source |
| 17 | | Out of range | IEEE 802.11 beacon frames detected in the channel |
| 18 | | Out of range | Presence of Primary use entity (RADAR/TV signal) detected |

TABLE 7.2.3-1-continued 5-bit CQI Table

| CQI index | modulation | code rate × 1024 | efficiency |
|---|---|---|---|
| 19 | | Out of range | Strong interference from another LTE-U source |

Upon receiving the CQI report, the LTE-U eNB may take appropriate action to either choose an appropriate modulation and coding scheme (MCS) (when a reported CQI index value is in the range of 1-15) or as follows (when a reported CQI index value is other than 1-15):

CQI report indicating interference from another IEEE 802.11 source (CQI index value 16) is received. In this case, the UE is likely to be in the vicinity of another IEEE 802.11 non-AP STA. The LTE-U eNB can either reconfigure the UE with a different SCell or stop utilizing the channel for a specified time period and then use the same SCell (assuming the interference due to the presence of another IEEE 802.11 source is temporary).

CQI report indicating interference from an IEEE 802.11 AP (i.e. beacon frames detected, CQI index value 17) is received. In this case, the LTE-U eNB can choose to remove the corresponding SCell for the UE and configure another SCell for the UE where possible.

CQI report indicating presence of a primary use entity (CQI index value 18) is received. In this case, the LTE-U eNB has to immediately cease operating in this SCell for all the UEs in the SCell and remove the SCell for all UEs. The LTE-U eNB may subsequently choose to add a different SCell for the UEs. Further to receiving this indication, the LTE-U eNB also refrains from using this frequency for any future SCells for a specific period of time. This time period may be chosen based on the regulatory requirements governing the channel usage in presence of primary users in a given jurisdiction. In other words, the time period for which the channel is left unused may be dependent on the geographical area or the type of the detected primary channel, etc.

CQI report indicating strong interference from another LTE-U source (CQI index value 19) is received. In this case, the LTE-U eNB can try to resolve the interference situation by coordinating the channel usage with the neighbor eNBs (e.g. via X2 based signaling or ProSe direct communication) or remove the SCell and migrate to a different SCell channel for operation.

When a CQI index value between 1-15 is received by the LTE-U eNB (from any UE of a given set of UEs) regarding a specific channel of an unlicensed spectrum, the LTE-U eNB may assume that the specific channel (in the unlicensed spectrum) is available for DL transmissions. In this case, the LTE-U eNB can schedule DL data either with or without transmitting Clear to Send (CTS) in the specific channel to UEs.

It should be noted that transmission of CTS ahead of data transmission can be used when the LTE-U eNB detects a possibility of a collision (and has chosen to occupy the channel for a longer period of time, e.g. more than 1 transmission time interval or TTI). For example, if the LTE-U eNB receives CQI index values indicating good channel quality from the UEs in a cell, the LTE-U eNB may assume presence of a clear SCell channel and hence can start using the channel for DL transmissions to the UEs without transmitting CTS. Note that channel sensing is also done at the eNB side (prior to transmission) and the decision of using the channel with or without CTS may also depend on whether the eNB detects any presence of interference or high packet error rate in the SCell channel.

Reporting by MAC-CE or UE Assistance Information Message

In some implementations, a UE may report any information related to the channel quality of the SCell channel in a new Medium Access Control Protocol Control Element, MAC CE or in a UE assistance information RRC message. The UE may first trigger CQI out of range report (e.g. indicate CQI index value 0) concerning an SCell configured over unlicensed spectrum to obtain an uplink grant to transmit the MAC CE or UE assistance information RRC message in a granted UL resource to the LTE-U eNB. Alternatively, the UE can send a Buffer Status Report (BSR) over the licensed spectrum or PCell to obtain the uplink grant. When the LTE-U eNB receives a CQI out of range report concerning an SCell on an unlicensed channel, or receives a BSR including the logical channel group with signaling radio bearer 1 (SRB1), the LTE-U eNB can grant an UL resource by sending a Physical Downlink Control Channel (PDCCH) grant over the PCell to the UE. The UE can then report the channel problem in the MAC CE or RRC message.

Figure 4:
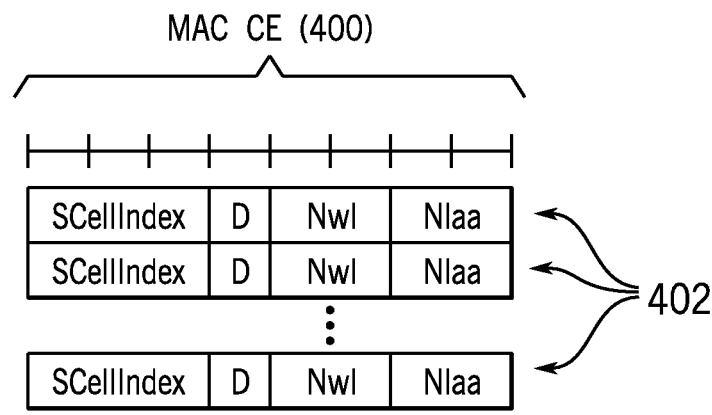
FIG. 4 is a schematic diagram of an example status reporting Medium Access Control (MAC) control element (CE), according to some implementations.

An example of a new MAC CE 400 according to some implementations of the present disclosure to report a status of a channel in an unlicensed spectrum is depicted in FIG. 4. The MAC CE 400 includes multiple entries 402, where each entry 402 has the following values:

SCellIndex, an index of an SCell for which status information is reported.

D, a value to indicate whether a primary use entity (e.g. an entity that performs Radar operation or an entity that transmits a TV signal is detected. The D value is set to a first value to indicate presence of the primary use entity, and to a second, different value to indicate absence of any primary use entity.

Nwl, a value to indicate a number of WLAN APs detected.

Nlaa, a value to indicate a number of LTE-U eNBs detected.

In alternative implementations, UE assistance information can be reported in a new information element of an RRC message, such as the UEAssistanceInformation RRC message as shown below. The UE assistance information is the UEAssistanceInformation RRC message can carry more information than a MAC CE. The UEAssistanceInformation RRC message can provide a list of channels that are not available due to these being used for purposes other than LTE-U, e.g. for Wi-Fi. This may be in the form of a reserved channel list (reserved LAAChannelList) so that the LTE-U eNB may avoid requesting measurement of or assigning these channels for LTE-U operation. For each reserved channel, the UE may report an index that identifies the channel and the reason e.g. Wi-Fi usage, etc. In addition, a list of most preferred channels (laaMostPreferredChannelList) or least preferred channels (laaLeastPreferredChannelList) in the unlicensed spectrum may be provided.

Furthermore, information can be provided for detected WLAN APs (detectedWlanAPsList that provides a list of detected WLAN APs detected by a UE) and detected LTE-U eNBs (detectedLAAeNBsList that provides a list of LTE-U eNBs detected by a UE).

The UEAssistanceInformation RRC message can also indicate presence of a detected primary use entity in primaryUserDetected. The location of the reporting UE can be specified in UELocation.

A WLAN mobile device may send a message having similar content to a WLAN AP to which the WLAN mobile device attaches to report conditions of channels being utilized for LTE-U operation in order to avoid the WLAN AP using the channels in communications with the WLAN mobile device.

| UEAssistanceInformation message |
|---|
| ```
-- ASN1START
UEAssistanceInformation-r11 ::=          SEQUENCE {
    criticalExtensions                   CHOICE {
        c1                               CHOICE {
            ueAssistanceInformation-r11      UEAssistanceInformation-r11-IEs,
            ueAssistanceInformation-r13      UEAssistanceInformation-r13-IEs,
            spare2 NULL, spare1 NULL
        },
        criticalExtensionsFuture         SEQUENCE { }
    }
}
UEAssistanceInformation-r11-IEs ::=      SEQUENCE {
    powerPrefIndication-r11              ENUMERATED {normal, lowPowerConsumption}   OPTIONAL,
    lateNonCriticalExtension             OCTET STRING                               OPTIONAL,
    nonCriticalExtension                 SEQUENCE { }                               OPTIONAL
}
UEAssistanceInformation-r13-IEs ::=      SEQUENCE {
    powerPrefIndication-r11              ENUMERATED {normal, lowPowerConsumption}   OPTIONAL,
    laaStatusList-r13                    SEQUENCE (SIZE (1..7)) OF laaStatus-r13,
    reservedLAAChannelList               SEQUENCE (SIZE (1..7)) OF LAAChannelInfo   OPTIONAL,
    laaMostPreferredChannelList          SEQUENCE (SIZE (1..7)) OF LAAChannelInfo   OPTIONAL,
    laaLeastPreferredChannelList         SEQUENCE (SIZE (1..7)) OF LAAChannelInfo   OPTIONAL,
    UELocation                           LocationInfo-r10                           OPTIONAL,
    lateNonCriticalExtension             OCTET STRING                               OPTIONAL,
    nonCriticalExtension                 SEQUENCE { }                               OPTIONAL
}
laaStatus-r13                            SEQUENCE {
    scellIndex                           SCellIndex
    primaryUserDetected                  ENUMERATED {TRUE}                          OPTIONAL,
``` |

-continued

| UEAssistanceInformation message | |
|---|---|
| detectedWlanAPsList OPTIONAL, | SEQUENCE (SIZE (1..7)) OF detectedWlanAPInfo |
| detectedLAAeNBsList OPTIONAL, | SEQUENCE (SIZE (1..7)) OF detectedLAAeNBInfo |
| nonCriticalExtention | SEQUENCE { }          OPTIONAL |

}
-- ASN1STOP

In other implementations, an InDeviceCoexIndication RRC message (used for reporting in-device coexistence interference between transceivers of different technologies in a UE, such as an LTE transceiver and a WLAN transceiver) can be extended to include at least one of reservedLAAChannelList, LaaMostPreferredChannelList and LaaLeastPreferredChannelList. Currently, the UE is allowed to transmit the InDeviceCoexIndication to the eNB only if the eNB configures to UE to send these indications. In some examples, if the UE detects a problem such as the presence of a primary use entity in the channel, the UE may autonomously transmit the InDeviceCoexIndication to the eNB without any explicit configuration enabling the InDeviceCoexIndication message transmissions. To support autonomous transmission of InDeviceCoexIndications, the eNBs supporting LAA may be mandated to understand and receive InDeviceCoexIndications from the UE. The InDeviceCoexIndication message may further be extended to provide further information regarding the SCell quality and also to provide a preferred channel list or channel list to avoid, etc., as mentioned above. Further, the InDeviceCoexIndication message may also indicate presence of the primary use entities in the unlicensed spectrum. Additionally, the UE may be allowed to use mechanisms such as autonomous denial of reception or transmission of LTE data without being explicitly configured by the eNB to do so. Such mechanisms of autonomous denial may be adopted by the UE to comply with regulatory requirements for instance when a primary use entity signal is detected within the operating channel. As such, the UE may be restricted to adopt such unconfigured autonomous denial mechanisms only if a primary use entity is detected. By adopting such mechanism, the UE refrains from transmitting on an operating channel despite receiving any explicit grant or command from the eNB to transmit data on the channel. In addition, in response to receiving any indication or grant to transmit on a channel, the UE, upon detecting the presence of a primary use entity in the channel, may trigger transmission of an InDeviceCoexIndication message and schedule it to be transmitted only on the licensed spectrum to indicate the reason for autonomous denial. The eNB may refrain from using the channel and adopt mechanisms for DFS upon receiving any indication of presence of primary use entity from the UE.

Measurement Configuration and Reporting

Figure 5:
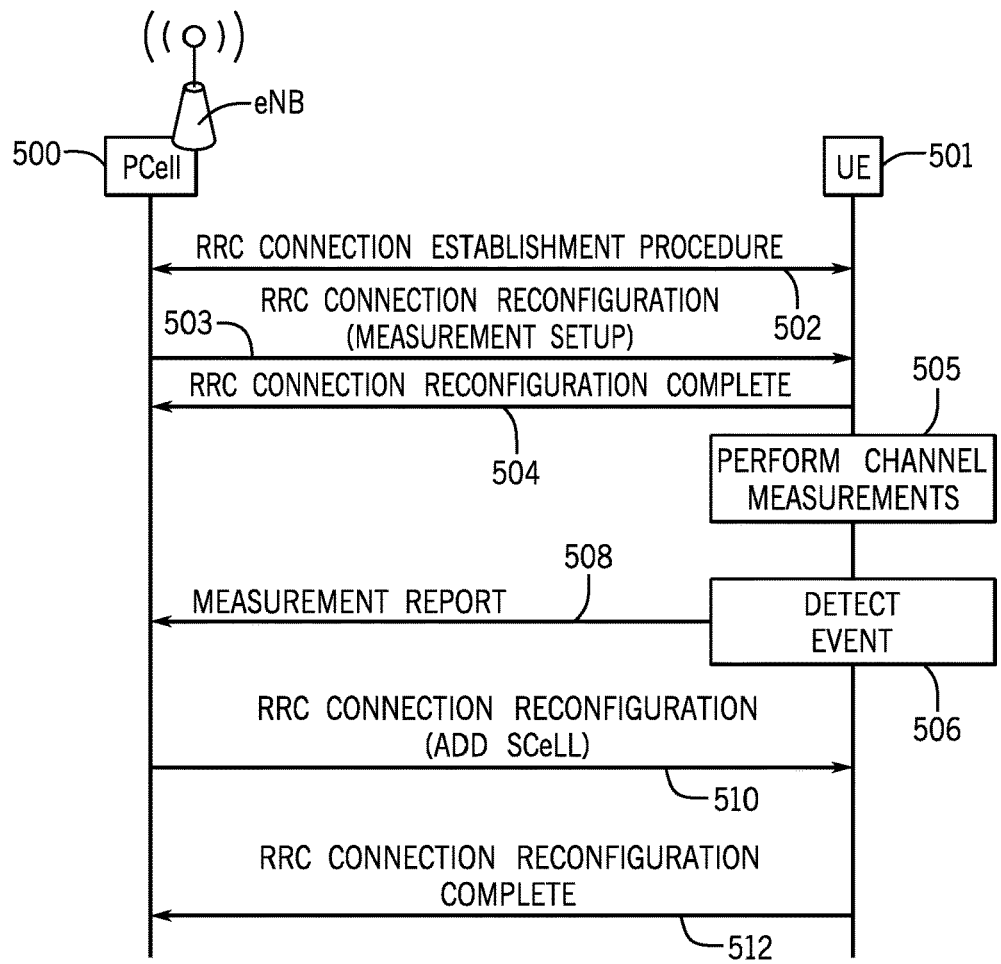
FIG. 5 is a message flow diagram of an example procedure between an enhanced nodeB (eNB) and a user equipment (UE), in accordance with some implementations.

In accordance with some implementations, a UE can be configured to perform channel measurements and to report information based on the channel measurements to an eNB. As shown in FIG. 5, a UE 501 can perform an RRC connection establishment procedure (at 502) with a PCell provided by an eNB. The RRC connection establishment procedure establishes an RRC connection between the PCell 500 and the UE 501. As part of the RRC connection reconfiguration procedure, a measurement configuration setup can be provided, which supports measurements of channels in the licensed spectrum as well as in the unlicensed spectrum. The RRC connection reconfiguration procedure involves the eNB sending (at 503) an RRC Connection Reconfiguration message to perform measurement setup), and the UE 501 responding (at 504) with an RRC Connection Reconfiguration Complete message. The RRC Connection Reconfiguration message is sent by the eNB to configure measurement of one or more channels of the unlicensed spectrum. The UE 501 can respond with a response accepting or rejecting measurement of the channel(s). The RRC Connection Reconfiguration Complete message (504) is used to accept measurement of the channel(s). The measurement configuration defined by RRC can be applied to the channels of the unlicensed spectrum.

Based on the measurement configuration setup, the UE 501 can perform (at 505) channel measurements of channels indicated in the measurement configuration, where the channels can be part of the licensed spectrum and an unlicensed spectrum. If the UE 501 is utilizing a given channel for other purposes (e.g. used for Wi-Fi, which renders the given channel unavailable for LTE-U measurement), or the given channel is one of the least preferred channels, then the UE 501 may indicate in the RRC Connection Reconfiguration Complete message (504) to the eNB that a corresponding measurement object for the given channel has not been configured. The UE 501 can also include a cause or reason field in the message, where the cause or reason field can indicate, for example, "in-use by Wi-Fi" or "strong interference." The message can be in an RRC Connection Reconfiguration Complete message, for example.

If conditions preventing channel measurements for the given channel are not present, then the UE 501 can perform channel measurements of the given channel. Events can be triggered in response to various criteria. For example, a first event can be triggered in response to an unlicensed channel (in an unlicensed spectrum) having a strength greater than a specified threshold. Upon detecting (at 506) a triggered event (e.g. the first event noted above), the UE 501 sends (at 508) a measurement report to the eNB.

In some examples, the measurement report can include any or some combination of the following information:
Information indicating presence of a primary use entity in the given channel.
Information indicating strong interference from WLAN APs or non-AP STAs in the given channel.
Information regarding WLAN APs detected by the UE on the given channel. The UE may include only the top N WLAN APs with strongest signal strength, and for each WLAN AP, any or some combination of the following information can be reported: BSSID, BSS load, primary channel, operating bandwidth, single strength, path loss, other information contained in Beacon frames, and other information.
Information regarding neighbor LTE-U eNBs detected by the UE on the given channel. The UE may include only the top M LTE-U eNBs with strongest signal strength, and for each LTE-U eNB, any or some combination of the following information: PCI, GCI, PLMN ID, signal strength, path loss, channel utilization information, and other information.

In addition to the foregoing event (first event), other events can also be defined, including any of the following events:

An event triggered by detection of a primary use entity. The eNB can configure a quiet time period in a given channel to allow the UE to perform detection for a primary use entity.

An event triggered by detected strong interference from WLAN APs or non-AP STAs.

An event triggered in response to detecting that (a) a new WLAN AP satisfies an entering condition, e.g. new WLAN AP's signal strength (e.g. Beacon RSSI) is higher than a specified threshold, or (b) a detected WLAN AP satisfies a leaving condition, e.g. the detected WLAN AP's signal strength is lower than a specified threshold.

An event triggered in response to detecting that (a) a new LTE-U eNB satisfies an entering condition, e.g. the new LTE-U eNB's signal strength (e.g. Reference Signal Received Power or RSRP) is higher than a specified threshold, or (b) a detected LTE-U eNB satisfies a leaving condition, e.g. the LTE-U eNB's signal strength is lower than a specified threshold.

In response to any of the foregoing events being triggered, the UE 501 can send (at 508) a measurement report. The measurement report can include Beacon frame information of a new WLAN or PLMN ID or other information available about a new LTE-U eNB, where appropriate. Specifically, the measurement report may include any information related to the WLAN network's carrier usage. Examples of this include information such as the primary channel frequency of the detected WLAN cell and information related to any secondary channels used by the WLAN AP when bandwidths larger than 20 MHz are in use for the detected WLAN AP.

To allow a UE to detect WLAN APs, a measurement gap can be configured by an eNB for the UE. A measurement gap refers to a time interval during which no transmissions or receptions with respect to the UE occur. The UE can perform measurements during the measurement gap to detect WLAN APs. Alternatively, the UE can utilize the discontinuous reception (DRX) off duration (when the receiver of the UE is turned off for power savings) to perform detection of WLAN APs.

Figure 6:
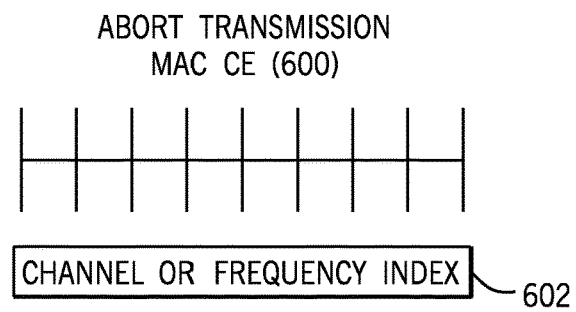
FIG. 6 is a schematic diagram of an example abort transmission Medium Access Control (MAC) control element (CE), according to some implementations.

In response to receiving a measurement report from the UE indicating presence of strong interference (from a WLAN AP or a neighbor LTE-U eNB) or indicating presence of a primary use entity on a given channel, the LTE-U eNB may stop scheduling DL transmissions on the given channel. In addition, the LTE-U eNB can transmit a new "abort transmission" MAC CE to a new group radio network temporary identifier (RNTI) in the PCell to stop ongoing uplink transmissions (which include retransmissions) by the UE. An example of an "abort transmission" MAC CE 600 is shown in FIG. 6. The "abort transmission" MAC CE 600 include an index 602 identifying a channel on which UEs should abort UL transmissions. In another alternative, the "abort transmission" indication may be also delivered via RRC signaling.

Reconfiguration Response

As further shown in FIG. 5, based on a measurement report (or multiple measurement reports) from a UE (or UEs), the eNB can decide to add an LTE-U SCell (an SCell on an unlicensed channel), by sending (at 510) an RRC Connection Reconfiguration message to add one or more LTE-U SCells. In response, the UE 501 can partially accept or explicitly reject some of the indicated LTE-U SCells in the RRC Connection Reconfiguration message. The UE may base a decision to reject a given LTE-U SCell based on the UE's preference regarding unlicensed channels or other considerations such as potential interference situation, hardware restriction, the channel being used by Wi-Fi, etc. For example, the LTE-U eNB may request to add multiple SCells over unlicensed channels and the UE may accept all of the unlicensed channels, or just some of the unlicensed channels, or reject some of the unlicensed channels, based on the information the UE has concerning Wi-Fi traffic or primary use entity operation in respective unlicensed channel(s). The UE may base the decision (for example for a specific band, sub-band, or channel) because the specific band, sub-band, or channel is being utilized locally by the UE for other operations such as Wi-Fi. The requested unlicensed channel may be one that is locally utilized by the UE for another purpose, or one that cannot be utilized due to the UE's hardware restrictions with regards to other channels in use for other operations.

In response to the RRC Connection Reconfiguration message, the UE can send (at 512) an RRC Connection Reconfiguration Complete message that may include a list of SCells that have or have not been added along with the associated cause or reason (e.g. Radar operation has been detected on a specific channel, or one or more interfering WLAN APs or LTE-eNBs have been detected, or a number of detected WLAN APs or LTE-U eNBs is higher than a threshold, or the UE is using the specific channel for another operation of another radio technology, such as Wi-Fi), or the specific channel is not available due to the usage of another channel for another operation of another radio technology. The same cause or reason can be applicable to RRC connection reconfiguration complete message, reply to RRC connection reconfiguration message requesting measurement configuration.

LTE-U UE Capabilities

A frequency region can refer to a range of frequencies that share similar requirements. An example of a frequency region is the 5-GHz frequency region (shown in FIG. 7) that includes the spectrum of 5,150 MHz-5,925 MHz. A part of the 5-GHz frequency range or the entire 5-GHz frequency range may be an unlicensed spectrum depending on the country.

In other examples, other frequency regions corresponding to other unlicensed spectrums can be provided. The 5-GHz frequency region or other unlicensed frequency region in which LTE-U is available may be defined so that the unlicensed frequency region is globally identifiable.

A frequency band (or more simply a "band") can refer to a subdivision of a frequency region. In some examples, six frequency bands 700-1, 700-2, 700-3, 700-4, 700-5, and 700-6 can be defined in the 5-GHz frequency region to accommodate current allocations in Europe and the United States, for example. In other examples, a different number of bands can be defined in the 5 GHz band or another unlicensed band.

Figure 7:
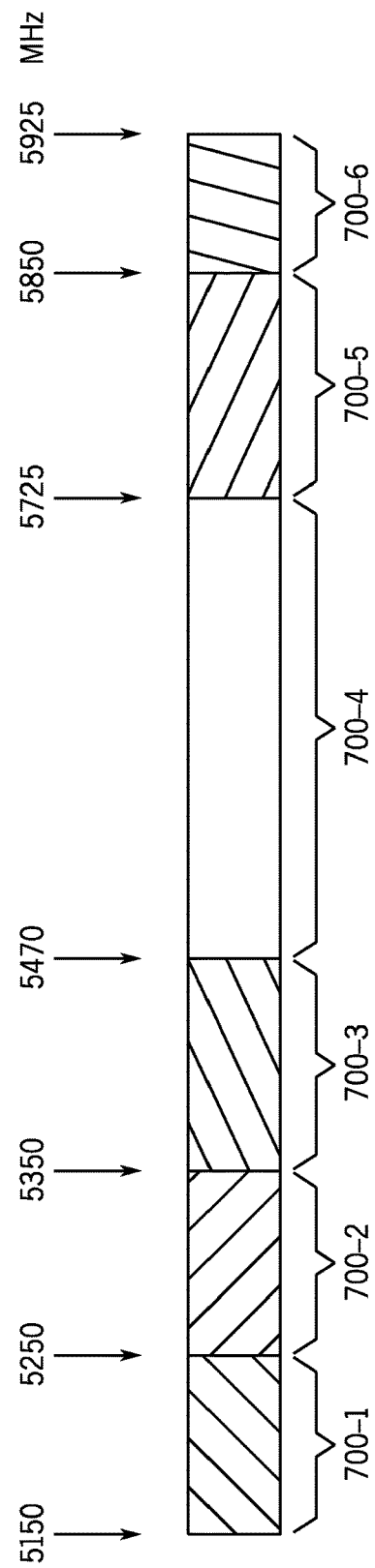
FIG. 7 is a schematic diagram of an example frequency region subdivided into bands, according to some implementations.

In FIG. 7, the frequency band 700-1 is in the range of 5,150 MHz-5,250 MHz. Each frequency band can in turn be sub-divided into channels. A channel can be the smallest addressable division of a frequency band, addressed by a channel identifier.

In some examples, channel identifiers can be in the form of E-UTRA Absolute Radio Frequency Channel Numbers (EARFCNs), which may be assigned to respective LTE-U channels. Alternatively, LTE-U channels may be identified by indexes.

Note that 100-KHz resolution for the channels in the unlicensed frequency region may not have to be provided, since the center frequencies of these channels are likely to be the same as the frequencies used by the corresponding IEEE 802.11 channels. Therefore, instead of using EARFCNs to identify channels in the unlicensed spectrum, WLAN channel numbers may be used to identify channels in other examples.

In some examples, mobile communications networks can use a 20-MHz channel, which can be utilized by multiple network operators. As an example, the lower 15-MHz portion of the 20-MHz channel can be used for operator A, while the upper 5-MHz portion of the 20-MHz channel can be used for operator B. In such scenarios, two channel portion indexes or identities are used to indicate or identify the center frequencies of the two portions of the 20-MHz channel. The channel portion indexes are different from the WLAN channel numbers, and can be used for LTE-U operation.

As a specific example, for WLAN channel 52 (in the range from 5,250-5,270 MHz), the center frequency of the lower 15-MHz portion is 5,257.5 MHz, while the center frequency of the upper 5-MHz portion is 5,267.5 MHz. A first channel portion index can be used to indicate the lower 15-MHz portion, while a second channel portion index can be used to indicate the upper 5-MHz portion.

Based on the available bands, various band combinations can be provided, where a band combination refers to a collection of frequency bands that can be used for communications between an eNB and a UE. A band combination can include one or more licensed frequencies and zero or more unlicensed frequencies. The full set of band combinations (permutations of licensed plus unlicensed frequencies) may be large. To reduce the number of band combinations involving licensed and unlicensed bands, the LTE-U eNB may indicate a set of licensed and unlicensed bands and requests the UE to report the band combinations (including the indicated bands only) that the UE can support.

The UE signals its support of licensed and unlicensed bands. For the supported combinations of unlicensed and licensed bands, different options exist for how the UE can signal supported/unsupported combinations:

The UE provides an exhaustive list of all combinations of supported unlicensed and licensed bands.

The UE provides a list of all bands, both unlicensed and licensed, together with a blacklist of combinations the UE does not support (or for which the minimum performance requirements are not guaranteed). This is to exclude combinations that would cause in-device coexistence problems due to, for example, inter-modulation products falling inside the supported bands. Multi-input, multi-output (MIMO) capability for 5-GHz frequency region may be considered constant regardless of the combination of licensed bands.

The UE reports all unlicensed bands the UE supports in addition to the licensed bands/band combinations and how many bands the UE can support simultaneously, and the eNB can choose the combinations that do not cause in-device coexistence problems, based on minimum performance requirements for the UE.

The eNB can indicate a set of licensed bands and request the UE to report the supported band combinations with the licensed bands and any supported unlicensed bands.

The eNB may indicate a set of licensed bands and unlicensed bands and request the UE to report the supported band combinations with the licensed bands and the unlicensed bands.

To further reduce the amount of UE capability signaling, the UE may initially report only band combinations of licensed bands. Subsequently, if the LTE-U eNB wants to utilize the unlicensed spectrum, the LTE-U eNB can request from the UE its supported band combination information for a specific list of licensed bands currently utilized as PCell and unlicensed bands which can be used with the combinations with the band currently utilized as PCell.

Another UE capability indication can indicate whether the hardware in the UE supporting the operation in the unlicensed band is for exclusive support of LTE-U or WLAN operation. That is, in the case where the UE has just a single radio transceiver (RF communications), if parts of the UE radio functionality (to support unlicensed operation) are common or shared by both WLAN and LTE-U technologies, the user's preference for one of the technologies versus the other may be used to govern which takes precedence. For example, the user preference (stored in the UE, for example) may specify that the presence of a WLAN connection will prohibit LTE-U operation, or vice versa. Conversely, in the case where the UE has dual radio transceivers that can perform RF communications independently of each other, the two radio transceivers operating in either the same or different unlicensed bands can in theory support both LTE-U and WLAN operations simultaneously, thus not causing any interruption of the LTE-U operation even if a WLAN connection is present.

To assist with the single radio transceiver scenario, the UE can report a subset of band combinations that are impacted or otherwise unavailable due to WLAN usage.

To inform the network about the UE's capabilities, the UE can simply indicate whether the UE possesses only a single radio transceiver operable in the unlicensed bands, or more than one radio transceiver. In the case that a single radio transceiver is indicated, this informs the eNB of the possibility that a user preference for normal WLAN operation can prohibit the device from LTE-U operation. Should the UE indicate that it possesses two (or more) radio transceivers operable in the unlicensed bands, further additional information may be provided to the eNB regarding how (and under which conditions) these radio transceivers can operate simultaneously.

In alternative implementations, rather than provide information regarding just the radio architecture (e.g. single radio transceiver or dual radio transceivers), the UE can signal additional UE capabilities, including the following, for example:

1) No support of simultaneous WLAN and LTE-U operations (which is the case if the UE has just a single radio transceiver).
2) Support of simultaneous WLAN and LTE-U operations:
   a. Support of simultaneous WLAN and LTE-U operations only in different frequency regions, e.g. WLAN operation in the 2.4-GHz frequency region, and LTE-U operation in the 5-GHz frequency region.
   b. Support of simultaneous WLAN and LTE-U operations in the same frequency region, but on different channels that may reside in different bands or sub-bands. In this case, a further indication of a frequency separation for simultaneous WLAN and LTE-U operations can be specified. Consider the example of the 5-GHz frequency region in FIG. 7, both radio transceivers may probably be operable across the whole frequency region, if applicable, when only one of WLAN or LTE-U operation is active. For simultaneous WLAN and LTE-U operations, however, a minimum frequency separation (which is configurable) between the channel used for WLAN operation and the channel used for LTE-U operation can be specified. This minimum frequency separation can either be implemented using an amount of free spectrum between the edges of the channels used for WLAN and LTE-U operations, or can implemented based on an indicated distance between the center frequencies of the channels used for WLAN and LTE-U operations, assuming a pre-defined or signaled transmission bandwidth of both WLAN and LTE-U. Knowledge of the assumed transmission bandwidth is used to react to changes in the transmission bandwidth. For example, WLAN bandwidth can dynamically change from 20 MHz to 80 MHz. A UE that indicated a certain minimum center frequency distance between WLAN operation and LTE-U operation assuming, for example, 20 MHz bandwidth for each technology, may not be able to operate with the same frequency separation in case the WLAN bandwidth changes to 80 MHz. The minimum frequency separation can be signaled by the UE to the eNB explicitly as a numerical value, as a selection from a predefined set of values, or as the number of radio frequency channels between WLAN and LTE-U operation frequencies. The minimum frequency separation may also be beneficial to support the signaling of different frequency separations towards higher and lower frequencies in case the front-end filters do not have a symmetrical transfer function with respect to the center frequency. If WLAN and LTE-U operations do not occur across the whole frequency region, the UE may signal the parts of the frequency region that each radio transceiver is operable in when supporting simultaneous WLAN and LTE-U operations (one radio transceiver of the UE performs WLAN operations, and the other radio transceiver of the UE performs LTE-U operations).

c. Unrestricted support of simultaneous WLAN and LTE-U operations. In this case, both WLAN and LTE-U radio entities can be operated in the same frequency band. For example, interference cancellation or other cancellation/avoidance techniques may be utilized to realize the feature.

Note that support for (b) implies also support for (a) and support for (c) implies also support for (a) and (b).

Generally, a wireless access network node receives, from the UE, information indicating support or lack of support for simultaneous WLAN operation and LTE-U operation. The wireless access network node can use the received information to select at least one channel of the unlicensed spectrum for communicating data of the UE.

As discussed above, a UE may dynamically provide, in various messages (such as channel quality reports, MAC CEs, UE Assistance Information RRC messages), lists of channels that may include one or more of the channels being used for WLAN operation, and/or channels that cannot be utilized for LTE-U due to the usage of other technologies (in light of UE hardware restrictions), and/or other information.

The UE capability signalling outlined in 1) and 2) above, allows the UE to provide up-front information to the eNB related to its RF architecture and its capabilities to support simultaneous WLAN and LTE-U operations. By doing so, this may then obviate or lessen having to perform regular reporting as discussed further above.

Generally, a UE detects a problem condition related to a wireless channel in an unlicensed spectrum, and transmits an indication indicating the problem condition to a wireless access network node.

The indication indicates the problem condition is transmitted on a wireless channel in a licensed spectrum.

The problem condition relates to detection of one or more of the following conditions: detection of a presence of a primary use entity on the wireless channel, and detection of a presence of another interference source on the wireless channel.

The UE refrains from transmitting on the wireless channel subsequent to detecting the problem condition.

The indication indicating the problem condition is included in a message selected from at least: a Channel Quality Indicator (CQI) message, a UE assistance information message, and an IndeviceCoexIndication message.

The UE sends, to the wireless access network node, information regarding combinations of frequency bands in the unlicensed spectrum and in the licensed spectrum not supported by the UE.

In response to an indicator of the problem concerning a secondary cell, a first wireless access network node performs an action selected from among: ceasing utilization of the first channel, configuring another channel in the unlicensed spectrum for use by the UE, or coordinating usage of the first channel with a neighbor wireless access network node.

The indicator in a channel quality report includes a Channel Quality Indicator (CQI) index set to a specific value, and the CQI index is settable to other values indicating that the first channel is available for communication of data.

Responsive to the CQI index set to one of the other values, data is transmitted over the first channel with or without transmitting a Clear to Send (CTS), where transmission of the CTS is performed responsive to the wireless access network node detecting a possible collision with transmission from another source.

Assistance information is received in a Medium Access Control (MAC) control element (CE) or a Radio Resource Control (RRC) message.

A wireless access network node receives, from the UE, a Channel Quality Indicator (CQI) set to out of range or a Buffer Status Report (BSR). Responsive to the CQI out of range report or BSR, the wireless access network node sends an uplink grant to the UE, the uplink grant providing an uplink resource for the UE to send the assistance information in the MAC CE or RRC message.

The wireless access network node receives, from the UE, information regarding frequency bands in the unlicensed spectrum and in a licensed spectrum supported by the UE.

The wireless access network node receives, from the UE, information regarding combinations of frequency bands in the unlicensed spectrum and in the licensed spectrum not supported by the UE.

The wireless access network node receives, from the UE, information specifying a number of bands that the UE can support simultaneously. The wireless access network node chooses a combination of frequency bands to use to avoid in-device coexistence interference.

The received information is responsive to information sent by the wireless access network node to the UE identifying one or more of frequency bands in licensed spectrum and frequency bands in the unlicensed spectrum.

Inter- or Intra-Node Coordination

As part of channel selection of channel(s) in an unlicensed spectrum, wireless access network nodes can communicate information to each other. For example, an LTE-U eNB can receive certain information from a WLAN AP or another LTE-U eNB. The exchange of information can include intra-physical node communications, in examples where a physical node implements wireless access functionalities for different radio access technologies (e.g. LTE and WLAN). As an example, a physical node can include an LTE-U eNB and a WLAN AP (which in this case are considered logical wireless access network nodes implemented on a physical node).

The exchange of information can also include inter-physical node communications between different physical nodes (e.g. an LTE-U eNB and a WLAN AP).

As examples, any or some combination of the following information can be exchanged between wireless access network nodes using intra-physical node communications or inter-physical node communications, for assisting in the selection of best channel(s) or for bandwidth adjustment. For each channel that is supported by a wireless access network node (e.g. LTE-U eNB or WLAN AP), the following information can be exchanged:

The channel utilization of the wireless access network node.
The average queueing delay
Output power.
Channel measurement, e.g. interference level.
Indication of detected primary use entity.
Indication of strong interference.
(A number of) WLAN APs detected. Per WLAN AP the information may include any or some combination of: BSSID, BSS load information, primary channel, operating bandwidth, signal strength of the detected AP, the number of non-AP STAs attached, other information contained in the Beacon frames, and other information.
(A number of) LTE-U eNBs detected. Per LTE-U eNB the information may include any or some combination of the following: PCI, GCI, PLMN ID, signal strength and quality, channel utilization information, the number of connected UEs, and other information.

For each wireless access network node, the following information can also be exchanged:

PLMN ID.
Location information of the wireless access network node, e.g. GPS coordinates.
Current configuration of the wireless access network node, e.g. which channels are utilized for which radio access technology (LTE or WLAN).
Current traffic volume being served by the wireless access network node.
Scheduled change of channels for operation (e.g. LTE-U operation or WLAN operation).

Intra-Node Information Exchange

Figure 8:
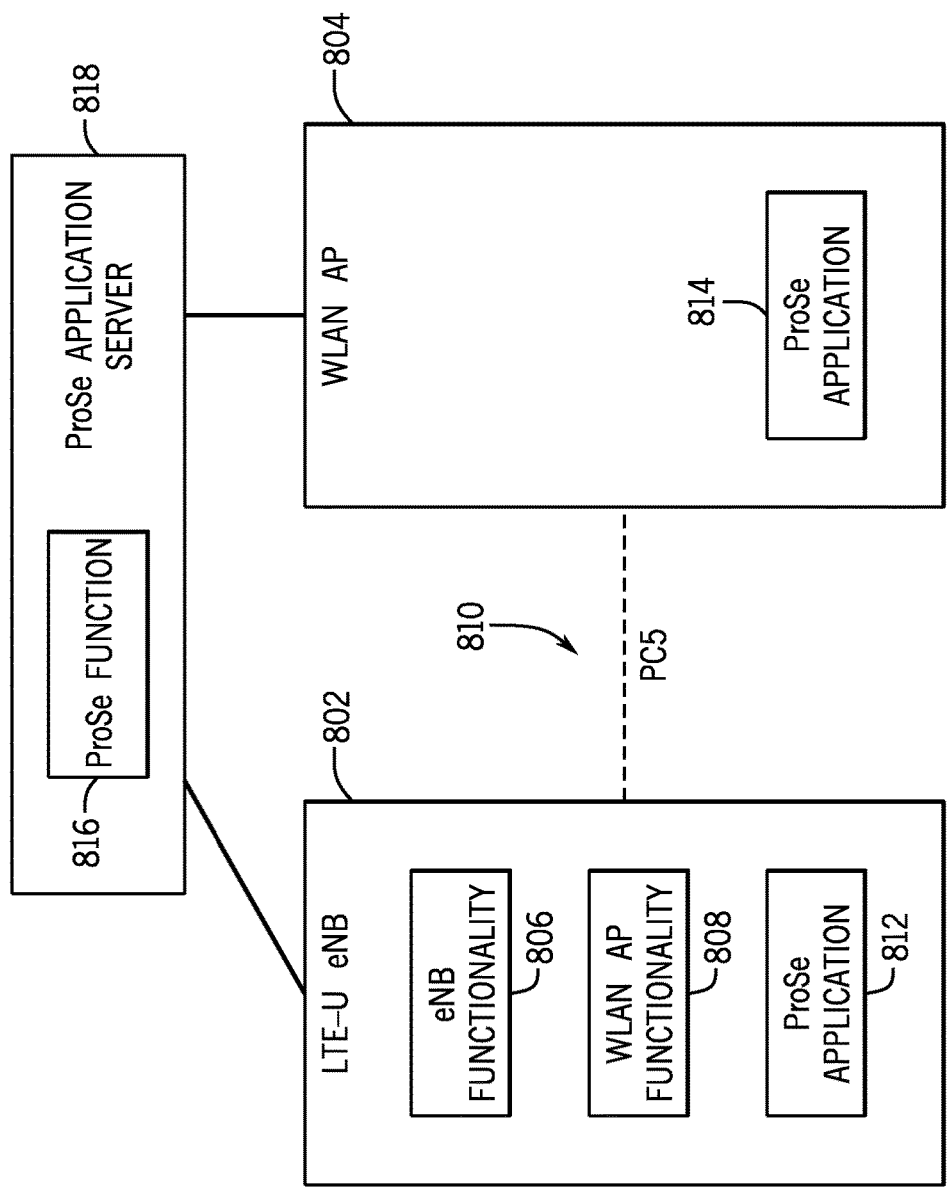
FIG. 8 is a block diagram of n example arrangement including an eNB and a Wireless Local Area Network (WLAN) access point, according to some implementations.

FIG. 8 shows an example arrangement of wireless access network nodes, including an LTE-U eNB 802 and a WLAN AP 804. The LTE-U eNB 802 provides a physical node that includes both an eNB functionality 806 and a WLAN AP functionality 808. The eNB functionality 806 can be referred to as an eNB, while the WLAN functionality 808 can be referred to as a WLAN AP.

Communications between the eNB 806 and WLAN AP 808 are intra-physical node communications. Information collected by the WLAN AP 808, e.g. Wi-Fi related information (such as discussed above) may be provided to the eNB 806 for use in channel selection of channels for LTE-U operations. LTE-U eNB information such as the LTE-U related information discussed above may be provided to the WLAN AP 808 for use in WLAN AP channel selection.

Inter-node Information Exchange

FIG. 8 also shows another WLAN AP 804 that is on a physical node that is separate from the physical node implementing the LTE-U eNB 802. Note that the physical node on which the WLAN AP 804 is located may also include an eNB, in some examples. Alternatively, the WLAN AP 804 may be a standalone physical node. Although not shown, there can be other LTE-U eNBs and WLAN APs that are in the proximity of the LTE-U eNB 802 and the WLAN AP 804.

The LTE-U eNBs and WLAN APs in proximity to each other (such as the LTE-U eNB 802 and the WLAN AP 804) can exchange information over the air (810), where the exchanged information is useful for selecting a channel and bandwidth adjustment. The over the air interface is a wireless interface and can include an X2 interface, a PC5 interface, or another interface. An X2 interface is an interface between eNBs. A PC5 interface is used as part of a proximity service (ProSe) as provided by 3GPP TS 23.303, which allows for proximate UEs to discover each other and to communicate each other directly. As discussed further below, ProSe proximity discovery can be used to allow wireless access network nodes (e.g. LTE-U eNBs and WLAN APs) to discover each other so that they can exchange information with each other to assist in channel selection in an unlicensed spectrum.

Exchange of the information between the LTE-U eNBs and WLAN APs in proximity is useful to avoid interference with each other. In some implementations, the LTE-U eNB 802 can utilize ProSe direct discovery to identify another LTE-U eNB or WLAN APs in proximity, if the other LTE-U eNB or WLAN AP also supports ProSe. As shown in FIG. 8, the LTE-U eNB 802 includes a ProSe application 812 and the WLAN AP 804 similarly includes a ProSe application 814, so that the LTE-U eNB 802 and the WLAN AP 804 can perform ProSe direct discovery.

Once the wireless access network nodes have discovered each other, ProSe direct communication can be used to exchange information between the wireless access network nodes to assist in channel selection. The advantage of using direct discovery and communication is to avoid having to configure inter-node interfaces such as the X2 interface.

The nodes involved in LTE-U operation may be pre-authorized and pre-provisioned by an Operation & Maintenance (O&M) system to perform ProSe discovery and communication only for LTE-U information exchange purposes so that the authorization and provisioning tasks of the ProSe procedure can be skipped.

There are two models (Model A and Model B) in ProSe direct discovery. Model A is for announcing ("I am here") and Model B is for solicitation ("who is there?"). In model A, an announcing wireless access network node transmits a discovery message to the PC5 interface, and a monitoring wireless access network node receives the discovery message through the PC5 interface. The announcing wireless access network node is configured with an allowed range (a list of range classes), which is translated into a transmission power of the discovery message. The monitoring wireless access network node can perform a match report procedure to authenticate the received discovery message. Upon successful authentication, the announcing wireless access network node and the monitoring wireless access network node can set up a direct communication channel to exchange information (as discussed above) to assist in channel selection. Note that the wireless access network nodes can perform the discovery and communication repeatedly to keep the information up to date.

If Model B is used, when a first wireless access network node starts up, the first wireless access network node may start the model B discovery (who is there?). A neighbor wireless access network node that received the discovery message (over the PC5 interface) may reply to the first wireless access network node and provides the neighbor wireless access network node's layer 2 source address for subsequent direct communication for exchanging the information described above.

As further shown in FIG. 8, a ProSe function 816 within a ProSe application server 818 can also be present in the core network to support ProSe direct discovery between wireless access network nodes.

Some WLAN APs may not support the ProSe protocol. In such scenarios, the LTE-U eNB 802 can exchange Wi-Fi related information collected from its band scan of the supported channels, its built-in WLAN AP 808, or the assistance information reported from UEs with the other ProSe-enabled node, for example LTE-U eNB.

The direct discovery or communication for the inter-physical node coordination may be conducted over licensed or unlicensed channels. ProSe discovery and communication for LTE-U inter-physical node coordination over the unlicensed channels may have advantage over ProSe discovery and communication over licensed channels due to the following:
1) PLMN agnostic discovery is possible and a wireless access network node does not have to listen to the other channels for other PLMNs.
2) Discovery range can be more accurately configured because discovery messages are transmitted over the target frequency of the LTE-U operation.

The allowed range of the discovery message can be appropriately configured depending on LTE-U operation frequencies, e.g. 2.4-GHz band or 5-GHz band.

Generally, a first wireless access network node includes a communication interface to wirelessly receive, from a second wireless access network node, information relating to the second wireless access network node. At least one processor in the first wireless access network node selects, based on the received information, at least one channel in an unlicensed spectrum.

ProSe Discovery Parameters

To support ProSe discovery between wireless access network nodes, various ProSe discovery parameters are defined. The ProSe discovery parameters include a ProSe application ID and an allowed range.

In accordance with some implementations of the present disclosure, the ProSe application ID (as described in 3GPP TS 23.303) can be defined for:
  LTE-U eNBs operating over a particular LTE-U channel, such as channel 1, 6, or 11 of the 2.4-GHz frequency region, or channel 40 of the 5-GHz frequency region.
  LTE-U eNBs operating within a certain LTE-U unlicensed region or band.
  WLAN APs operating over a Wi-Fi channel, such as channel 1, 6, or 11 of the 2.4-GHz frequency region or channel 56 of the 5-GHz frequency region.
  WLAN APs operating over a Wi-Fi frequency region or band.
  Any combination of the above The allowed range is another ProSe discovery parameter that can be defined. As noted above, the allowed range is a list of range classes, which is translated into the transmission power of a discovery message. The allowed range can be defined for:
  the 2.4-GHz frequency range.
  One or more 5-GHz bands that have different transmission power characteristics.

ProSe Direct Communication Parameters

To perform direct communications between wireless access network nodes after ProSe discovery, various ProSe direct communication parameters can be defined. The ProSe direct communication parameters can include a ProSe UE ID and a ProSe Layer 2 Group ID. According to 3GPP TS 23.303, the ProSe UE ID is a link layer identifier assigned by A ProSe Key Management Function as defined in 3GPP TS 33.303, where the ProSe UE ID uniquely represents the UE in the context of one-to-many ProSe direct communication for a group. The ProSe UE ID is used as a source layer 2 ID in packets the UE sends for one-to-many ProSe direct communication.

In the context of ProSe direct communications between wireless access network nodes (rather than UEs), the ProSe UE ID can be set to a layer 2 ID of a wireless access network node.

According to 3GPP TS 23.303, the ProSe Layer 2 Group ID is a link layer identifier that identifies the group in the context of one-to-many ProSe direct communication. The ProSe Layer 2 Group ID is used as a destination Layer 2 ID in packets a UE sends to this group for one-to-many ProSe direct communication.

In the context of ProSe direct communications between wireless access network nodes (rather than UEs), the ProSe Layer 2 Group ID can be set to the layer 2 of the node group. Some examples include:
  LTE-U eNB Group ID for LTE-U operation in a certain frequency band or LTE-U operation over a certain LTE-U channel, such as channel 1, 6, or 11 of the 2.4-GHz frequency region, or channel 40 of the 5-GHz frequency region.
  WLAN AP Group ID for a Wi-Fi band or channel, such as channel 1, 6, or 11 of the 2.4-GHz frequency region, or channel 52 of the 5-GHz frequency region.
  Both of the above.

Alternative to the use of the ProSe Layer 2 Group ID, one-to-one direct communication may be used between the two wireless access network nodes in proximity. One wireless network access node may be assigned with the first ProSe UE identifier and another wireless access network node may be assigned with the second ProSe UE identifier. The first node transmits the information relating to the first node to the second ProSe UE identifier and the second node sends the information relating to the second node to the first ProSe UE identifier to exchange the information for channel selection.

Once neighbors are discovered, they may exchange information described below using ProSe direct communication. ProSe Layer 2 Group Id may be assigned to neighbor LTE-U eNBs.

In further implementations, LTE-U eNBs can exchange the channel status (i.e. status of the channels configured as SCells) over the X2 or other interface. This ensures that the LTE-U eNBs have an idea of the channel distribution among neighboring LTE-U eNBs to avoid the interference with each other.

Figure 9:
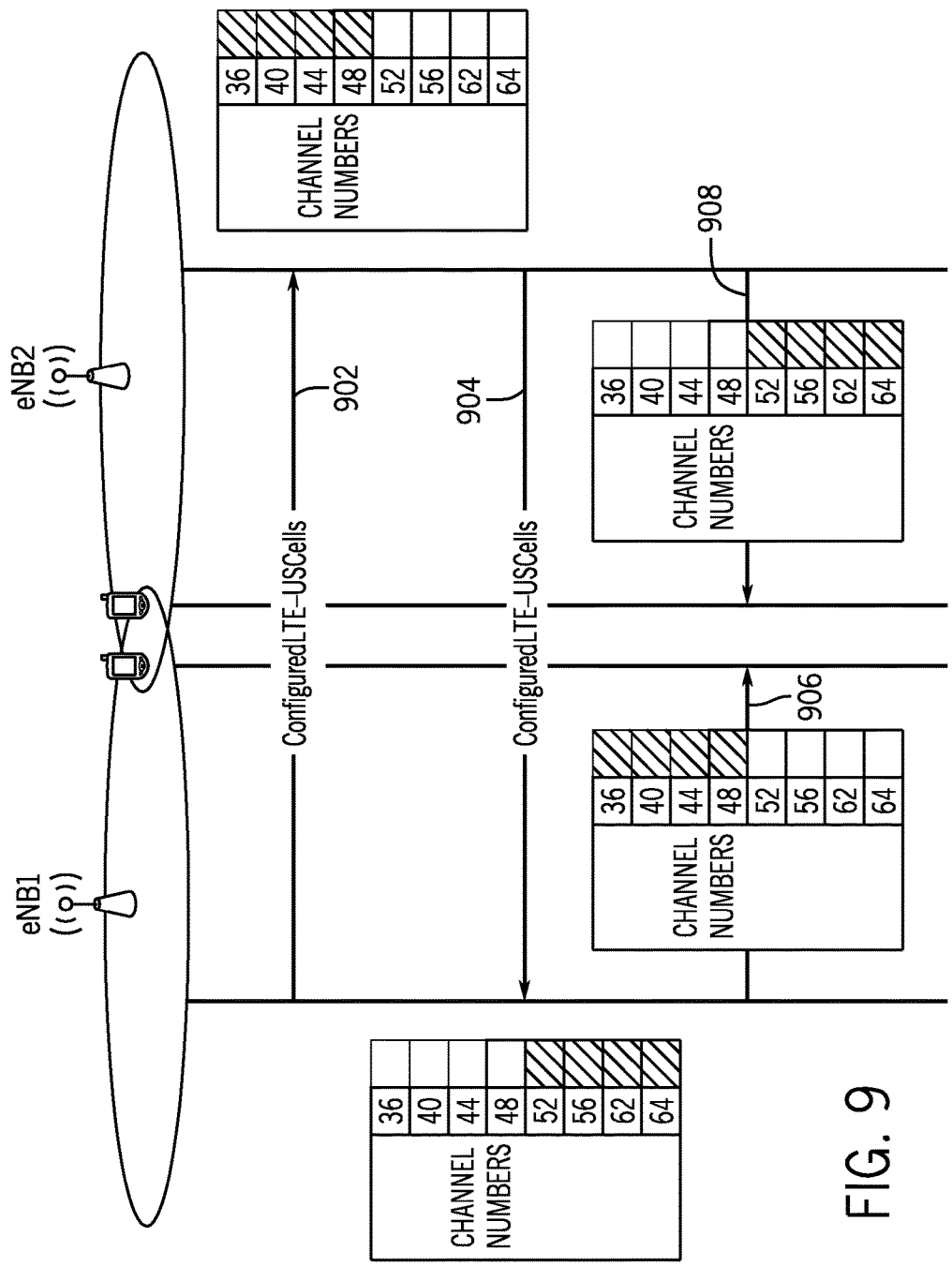
FIG. 9 is a block diagram illustrating exchange of information between eNBs, according to further implementations.

As shown in FIG. 9, two neighboring eNBs, eNB1 and eNB2, can exchange certain information. eNB1 sends (at 902) to eNB2 information regarding the channels that eNB1 has currently configured as LTE-U SCells. In response, eNB2 can choose the remaining channels as its own LTE-U SCells, and sends (at 904) to eNB1, information indicating the channels that eNB2 has currently configured as LTE-U SCells.

Subsequently, eNB1 and eNB2 can use the indicated channels to transmit (at 906, 908, respectively) data to UEs in the unlicensed spectrum within the respective coverage areas of eNB1 and eNB2.

System Architecture

Figure 10:
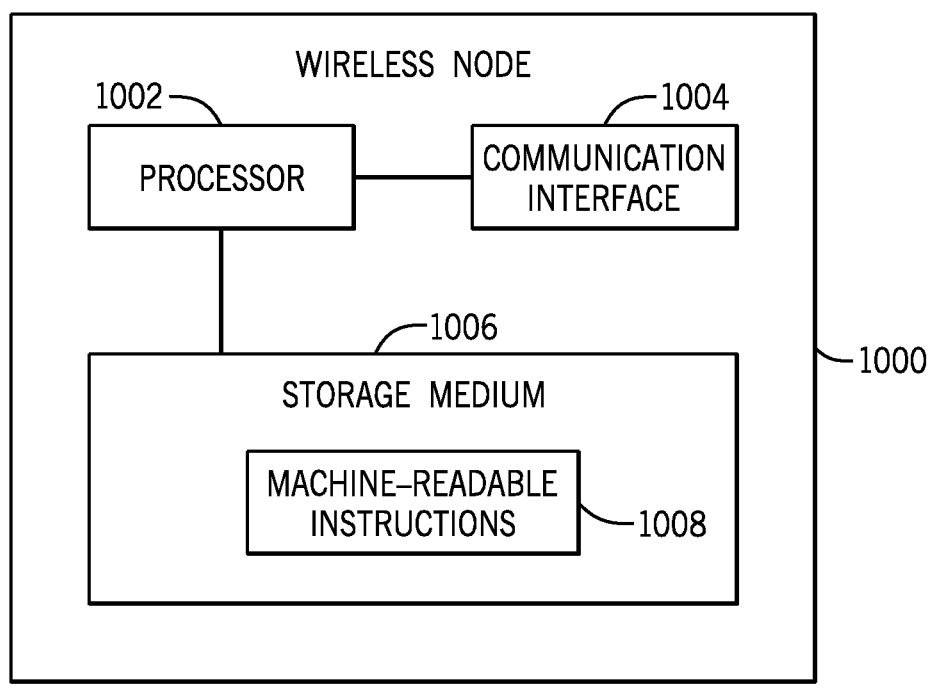
FIG. 10 is a block diagram of a wireless node, according to some examples.

FIG. 10 is a block diagram of a wireless node 1000 according to some examples, which can be a wireless access network node (e.g. eNB or WLAN AP) or a UE. The wireless node 1000 includes a processor (or multiple processors) 1002 that is coupled to a communication interface 1004 (for communicating with another node or over the air with a UE). A processor can include a microprocessor, a microcontroller, a programmable integrated circuit, a programmable gate array, and so forth.

The processor(s) 1002 can also be coupled to a non-transitory machine-readable or computer-readable storage medium 1006 storing machine-readable instructions 1008 that are executable by the processor(s) 1002 to perform any of the various tasks of wireless access network nodes or UEs discussed above.

The storage medium (or storage media) 1006 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
sending, by a first wireless access network node to a user equipment (UE), a configuration message to add a plurality of secondary cells on at least one channel of an unlicensed spectrum;
receiving, by the first wireless access network node from the UE, a response message responsive to the configuration message, the response message comprising information accepting a first secondary cell of the plurality of secondary cells, and information rejecting a second secondary cell of the plurality of secondary cells, and the response message comprising assistance information indicating one or more channels of the unlicensed spectrum to avoid, wherein the information accepting the first secondary cell comprises information identifying the first secondary cell as being added responsive to the UE accepting the first secondary cell in response to the configuration message, and the information rejecting the second secondary cell comprises information identifying the second secondary cell as not being added responsive to the UE rejecting the second secondary cell in response to the configuration message; and
responsive to the assistance information, selecting, by the first wireless access network node, at least a first channel of the unlicensed spectrum for communicating data with the UE.

2. The method of claim 1, wherein the selected at least the first channel is in addition to a second channel that is part of a licensed spectrum used to communicate data of the UE.

3. The method of claim 1, wherein the assistance information comprises an indication of a channel in which a primary use entity has been detected.

4. The method of claim 1, wherein the assistance information comprises information regarding a quantity of Wireless Local Area Network (WLAN) access points or Long-Term Evolution LTE) enhanced NodeBs detected on a particular channel.

5. The method of claim 1, wherein the assistance information comprises information regarding at least one channel reserved by the UE to use for another access technology or due to a hardware restriction caused by use of a further channel used by another access technology.

6. The method of claim 1, wherein the assistance information comprises information regarding a quality of a channel.

7. The method of claim 1, wherein the assistance information comprises information regarding a detection of presence of another strong interference source on a channel.

8. The method of claim 1, wherein the response message comprises information identifying a cause or reason for the UE accepting the first secondary cell, and a cause or reason for the UE rejecting the second secondary cell.

9. The method of claim 1, further comprising:
receiving, by the first wireless access network node from the UE, information indicating support or lack of support for simultaneous Wireless Local Area Network (WLAN) operation and Long-Term Evolution in unlicensed spectrum operation.

10. The method of claim 9, wherein the information indicating support or lack of support identifies at least one frequency region in which simultaneous WLAN operation and Long-Term Evolution in unlicensed spectrum operation are supported.

11. The method of claim 9, wherein the information indicating support or lack of support identifies different channels in a frequency region for respective simultaneous WLAN operation and Long-Term Evolution in unlicensed spectrum operation.

12. The method of claim 11, wherein the information indicating support or lack of support further identifies a frequency separation between the different channels for the respective WLAN operation and Long-Term Evolution in unlicensed spectrum operation, wherein the frequency separation comprises a separation between edges of channels used for WLAN and Long-Term Evolution in unlicensed spectrum operations, or a distance between center frequencies of the channels used for WLAN and Long-Term Evolution in unlicensed spectrum operations.

13. The method of claim 1, wherein the response message comprising the information accepting the first secondary cell and the information rejecting the second secondary cell is according to selection by the UE based on one or more factors considered by the UE in response to the configuration message, the one or more factors selected from among a preference of the UE and a hardware restriction of the UE.

14. A first wireless access network node comprising:
a communication interface comprising a transceiver to wirelessly receive assistance information transmitted by a second wireless access network node, the assistance information comprising information indicating one or more channels of an unlicensed spectrum to use or avoid, and a quantity of Wireless Local Area Network (WLAN) access points or base stations detected on a particular channel,
the first wireless access network node to provide a first coverage area in which user equipments (UEs) are able to communicate wirelessly with the first wireless access network node, and the second wireless access network node to provide a second coverage area in which UEs are able to communicate wirelessly with the second wireless access network node; and
at least one processor configured to, responsive to the assistance information including the information indicating one or more channels of the unlicensed spectrum to use or avoid, and the quantity of WLAN access points or base stations detected on the particular channel, select at least a first channel of the unlicensed spectrum for communicating data with a UE.

15. The first wireless access network node of claim 14, wherein the assistance information is selected from among: utilization of channels by the second wireless access network node in the unlicensed spectrum, output power of the second wireless access network node, a measurement of a channel used by the second wireless access network node, detection of a primary use entity in a channel of the unlicensed spectrum, an indication of interference, a configuration of channels used by the second wireless access network node, information of current traffic served by the second wireless access network node, and a scheduled change of channels for operation.

16. The first wireless access network node of claim 14, wherein the first wireless access network node is to wirelessly send, to the second wireless access network node, information relating to the first wireless access network node for use by the second wireless access network node to select at least one channel in the unlicensed spectrum.

17. The first wireless access network node of claim 14, wherein the at least one processor is configured to further perform Proximity Service (ProSe) direct discovery with the second wireless access network node, and perform ProSe direct communication with the second wireless access network node to receive information relating to the second wireless access network node.

18. The first wireless access network node of claim 17, wherein the ProSe direct discovery uses a ProSe application identifier and an allowed range.

19. The first wireless access network node of claim 17, wherein the ProSe direct communication uses a ProSe user equipment (UE) identifier and a ProSe Layer 2 Group identifier, the ProSe UE identifier set to a layer 2 identifier of the second wireless access network node, and the ProSe Layer 2 Group identifier set to one of a Long-Term Evolution in unlicensed spectrum enhanced nodeB (eNB) Group identifier, a Wireless Local Access Network (WLAN) access point group identifier and the ProSe Layer 2 Group identifier defined for both the Long-Term Evolution in unlicensed spectrum eNBs and WLAN APs.

20. The first wireless access network node of claim 17, wherein a ProSe user equipment (UE) identifier is assigned to the first and the second wireless access node, and the second wireless access network node sends the information relating to the second wireless access network node to the ProSe UE identifier assigned to the first wireless access network node and the first wireless access network node sends the information relating to the first wireless access network node to the ProSe UE identifier assigned to the second wireless access network node.

21. A method comprising:
receiving, by a user equipment (UE) from a wireless access network node, a configuration message to add a plurality of secondary cells on at least one channel of an unlicensed spectrum;
in response to the configuration message, deciding, by the UE, to accept a first secondary cell of the plurality of secondary cells, and reject a second secondary cell of the plurality of secondary cells;
sending, by the UE to the wireless access network node, a response message responsive to the configuration message, the response message comprising information identifying the first secondary cell as being added responsive to the accepting of the first secondary cell by the UE, and information identifying the second secondary cell as not being added responsive to the rejecting of the second secondary cell by the UE, and the response message comprising assistance information indicating one or more channels of the unlicensed spectrum to avoid, the response message to cause the wireless access network node to select at least a first channel of the unlicensed spectrum for communicating data of the UE; and
using, by the UE, the first channel of the unlicensed spectrum selected by the wireless access network node to communicate data.

22. The method of claim 21, wherein the assistance information includes a list of channels on which a primary use entity has been detected by the UE.

23. The method of claim 21, further comprising:
receiving, by the UE from the wireless access network node, a reconfiguration message that configures the UE to perform measurements on channels in the unlicensed spectrum;
determining, by the UE, whether a given channel in the unlicensed spectrum is used for a particular purpose; and
in response to determining that the given channel in the unlicensed spectrum is used for the particular purpose, sending, by the UE, a response to the reconfiguration message to the wireless access network node, the response indicating to the wireless access network node that a corresponding measurement object for the given channel has not been configured.

\* \* \* \* \*

UNITED STATES PATENT AND TRADEMARK OFFICE
CERTIFICATE OF CORRECTION

| | | |
|---|---|---|
| PATENT NO. | : 10,397,794 B2 | Page 1 of 1 |
| APPLICATION NO. | : 14/609019 | |
| DATED | : August 27, 2019 | |
| INVENTOR(S) | : Suzuki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 63 days.

Signed and Sealed this
Second Day of June, 2020

Andrei Iancu
*Director of the United States Patent and Trademark Office*